Patented May 26, 1931

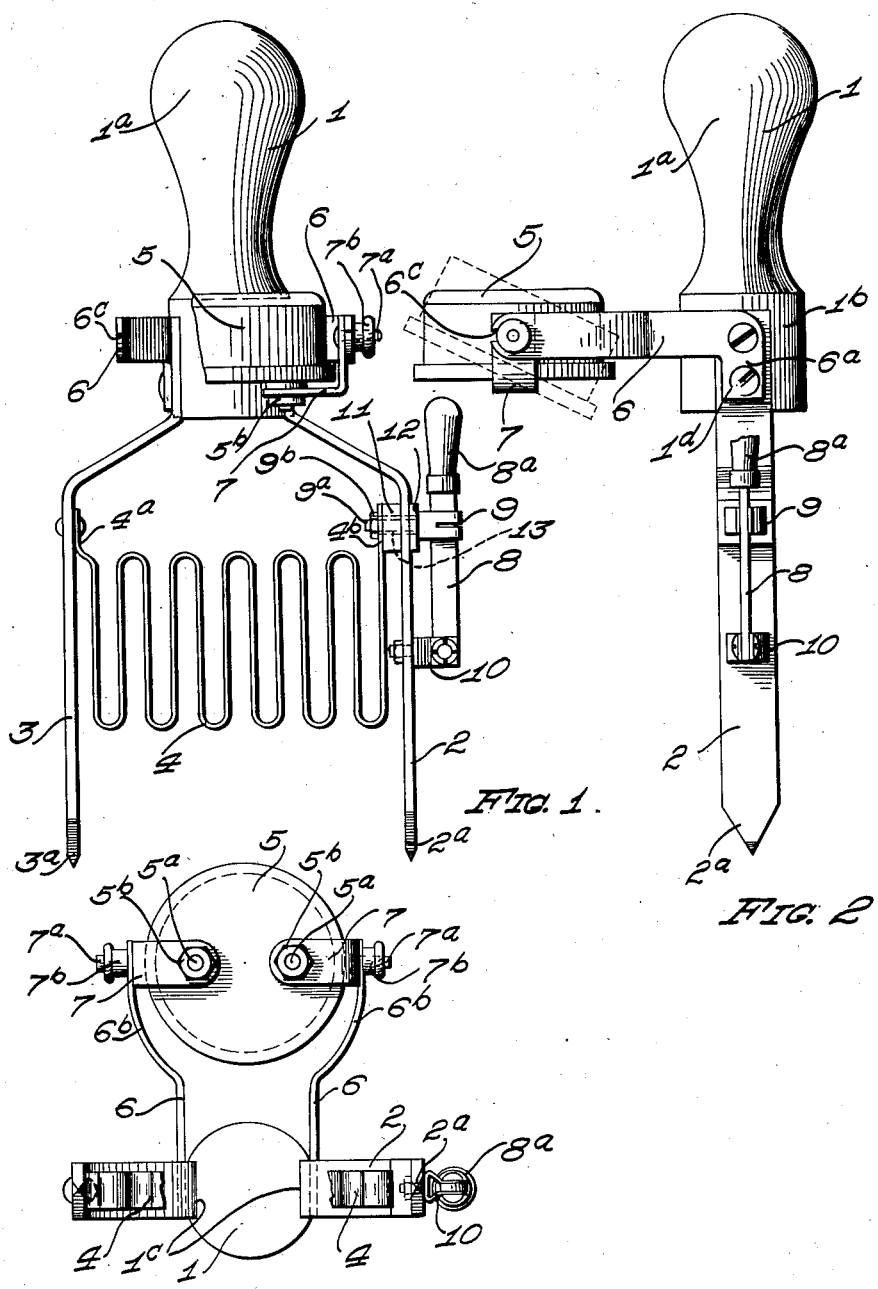

1,807,439

UNITED STATES PATENT OFFICE

WILLIAM D. RYAN, OF SAN DIEGO, CALIFORNIA

PROD TYPE BATTERY CELL TESTER

Application filed November 30, 1928. Serial No. 322,818.

My invention relates to a device for testing the individual cells of storage batteries and the objects of my invention are: first, to provide means for ascertaining the voltage of a cell during a period of heavy discharge; second, to provide a device for testing individual cells of a battery mounted on a vehicle or in an otherwise readily inaccessible position; third, to provide a device of this class with which both the open circuit and discharge voltage may be measured successively; fourth, to provide a self-contained device of this class which may be easily held in the hand and in which the meter may be angularly adjusted for enabling readings to be taken from different positions; fifth, to provide a device of this class in which the meter is pivotally mounted so that it will not so readily sustain damage if inadvertently struck; sixth, to provide a device of this class having a discharge resistance of known value and substantially constant temperature coefficient and a meter connected therewith by means of which the approximate discharge current may be readily ascertained; and seventh, to provide a device of this class which is simple of construction, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is an elevational view of my device with portions broken away in order to facilitate the illustration; Fig. 2 is a side elevational view, and Fig. 3 is a bottom view of my device, portions thereof being broken away in order to facilitate the illustration.

Similar characters of reference refer to similar parts and portions throughout the several views of the drawings.

The handle 1, prongs 2 and 3, resistor 4, meter 5, brackets 6 and 7, switch 8, clips 9 and 10, insulating blocks 11 and 12, form the principal parts and portions of my battery cell tester.

The handle 1 is made preferably of wood or other insulating material and is provided with a molded portion 1a forming the grip portion of the handle and the substantially cylindrical portion 1b forming the support portion of the handle. The cylindrical portion 1b is provided with two diametrically positioned, axially extending slots 1d, adapted to accommodate the upper end portions of the prongs 2 and 3. The latter are made preferably of hard rolled copper strap or other highly conductive metal and are pointed at their lower ends 2a and 3a to facilitate making good contact with the battery terminals. The upper ends of the prongs 2 and 3 are bent outwardly obliquely and the intermediate and lower portions extend downwardly parallel with the axis of the handle. They are spaced apart sufficiently to enable the points to be brought in contact with the two terminals of a cell.

Supported between the inner sides of the prongs is a resistor 4, which is made preferably of a material of fairly high conductivity in the form of a multiply folded strap. The one end 4a of the resistor is secured to the upper end of the straight portion of the prong 3. The joint of the resistor with the prongs is made very carefully in order to eliminate any appreciable contact drop. The opposite end 4b of the resistor is insulated from the prong 2 by means of the insulating blocks 11 and 12 positioned on the inner and outer sides respectively of the prongs.

The end 4b is in electrical contact with the switch clip 9 positioned on the outer side of the prong 2 and having an inwardly extending threaded stud 9a which passes through an insulating bushing 13 extending through the insulating blocks 11 and 12 and the prong 2. A nut 9b is provided for securing the end 4b of the resistor 4 to the stud 9a. The switch 8 is pivotally secured by means of the clip 10 to the prong 2, forming electrical contact therewith, and registers near its upper end with the clip 9. A suitable handle 8a is provided on the upper end of the switch 8 for facilitating the operation thereof.

The meter 5 which may be a conventional volt meter, adapted to register potential in the order of a few volts, is pivotally supported on the handle 1 by means of substantially L-shaped metallic brackets 6. The short legs 6a of said brackets are secured to the handle portion 1b by means of the screws 1c which may also secure the prongs 2 and 3 to the handle.

The brackets 6 are made of any suitable metal and form the electrical connection between the prongs 2 and 3 and the meter 5. The longer legs 6b of the brackets 6 extend substantially at right angles outwardly from the handle 1, the outer ends thereof being preferably offset laterally in order to provide sufficient space for accommodating the meter 5, as clearly shown in Fig. 3 of the drawings. The outer ends of the brackets 6 are provided with longitudinally extending slots 6c.

To the rearwardly extending meter terminal studs 5a are secured the angular brackets 7 by means of terminal nuts 5b. The brackets 7 are formed preferably of short lengths of metal strap having a substantially right angle bend. Near the one end of the brackets 7 is provided an aperture for receiving the terminal stud 5a of the meter and at its other end is provided a threaded stud 7a extending outwardly and adapted to be positioned within the slots 6d of the brackets 6 for pivotally supporting the meter on said brackets. Suitable thumb nuts 7b are provided for securing the brackets 7 to the brackets 6.

As indicated in Fig. 2 by dotted lines, the meter may be adjusted around the axis of the stud 7a to any angular position desired.

The resistor 4 being made of a comparatively long strip of metal offers a relatively large cooling surface, and as it may be made of a material having a practically constant temperature coefficient its resistance will remain fairly constant even when heated by the discharge current. As under these conditions the discharge current passing through the resistor 4 will bear a direct relation to the voltage indicated by the meter, the latter may be calibrated to indicate the voltage drop and the current flowing through the resistor.

When it is desired to register the open circuit potential of the cell to be tested, the switch 8 is opened thus preventing current from passing between the prongs 2 and 3 except through the volt meter 5.

It is thus possible to both indicate the state of charge of a cell of a battery as indicated by the open circuit reading and the condition of the plates of the cell as indicated by the discharge rate. This can be very conveniently done by means of my device when the battery is mounted on the vehicle, thus enabling a service man to quickly ascertain the condition of the battery without having to remove it.

As the prongs 2 and 3 offer a certain amount of lateral resiliency and the resistor 4 is longitudinally flexible, the spacing of the prong points 2a and 3a may be slightly varied to suit abnormal conditions. Because of the pivotal suspension of the meter 5 it is less liable to sustain damage in the event of it being struck inadvertently.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a device of the class described, a pair of prongs, a handle for supporting said prongs at their upper ends, a relatively flexible resistor connected at its one end to one of said prongs and at its other end to a clip secured to and insulated from said second prong, and a knife switch pivotally secured at its one end to said second prong and adapted to engage said clip.

2. In a device of the class described, a pair of prongs, a handle for supporting said prongs at their upper ends, a resistor connected at its one end to one of said prongs and at its other end to a clip secured to the outer side and insulated from said other prong, a switch pivotally secured at its one end to the outer side of said other prong and engageable with said clip, and a meter supported on said handle and electrically connected to said prongs.

3. In a device of the class described, a handle having a grip portion and a support portion, a pair of relatively laterally flexible prongs secured at their upper ends to said support portion and extending in substantially parallel spaced relation with the axis of said handle, a switch pivotally mounted on the outer side of one of said prongs and a relatively flexible resistor supported between said prongs and connected at its one end to one of said prongs and connectable at its other end by means of said switch to the other of said prongs.

4. In a device of the class described, a handle member having a grip portion and a substantially cylindrical support portion, a pair of diametrically opposed axially extending slots in the cylindrical portion, a pair of relatively flexible flat prongs supported at their upper ends in said slots to said support portion, said prongs being bent initially obliquely outwardly in opposite directions and downwardly in parallel spaced relation, a resistor secured at its one end to one of said prongs and at its other end to a clip insulated from and secured to the outer side of the other prong, a switch pivotally connected to said other prong on said outer side adapted to engage said clip and connect said other end of said resistor to said second prong, a pair of brackets secured at their one ends to said support member and forming electrical contact with said prongs, said brackets extending substantially at right angles to the axis of said handle in spaced parallel relation, and a meter pivotally supported at the outer ends of said brackets and connected electrically therewith.

In testimony whereof, I have hereunto set my hand at San Diego, California, this 17th day of November, 1928.

WILLIAM D. RYAN.